United States Patent
Wu et al.

(10) Patent No.: US 7,508,253 B1
(45) Date of Patent: Mar. 24, 2009

(54) CHARGE PUMP DEVICE AND OPERATING METHOD THEREOF

(75) Inventors: Cheng Ying Wu, Chu-pei (TW); Hsin Chang Lin, Chu-pei (TW)

(73) Assignee: Yield Microelectronics Corp., Hsin-Chu (TW)

( * ) Notice: Subject to any disclaimer, the term of this patent is extended or adjusted under 35 U.S.C. 154(b) by 0 days.

(21) Appl. No.: 11/898,384

(22) Filed: Sep. 12, 2007

(51) Int. Cl.
*G06G 7/26* (2006.01)
*G06G 7/12* (2006.01)

(52) U.S. Cl. .................. 327/536; 327/157; 327/537; 363/59; 363/60

(58) Field of Classification Search ............ 327/48, 327/157, 536, 537; 363/59, 60

See application file for complete search history.

(56) References Cited

U.S. PATENT DOCUMENTS 5,821,805 A * 10/1998 Jinbo .................. 327/537
2002/0130704 A1 * 9/2002 Myono et al. ............ 327/536

* cited by examiner

*Primary Examiner*—Long Nguyen
*Assistant Examiner*—Brandon S Cole
(74) *Attorney, Agent, or Firm*—Rosenberg, Klein & Lee

(57) ABSTRACT

A charge pump device and an operating method thereof are proposed. The charge pump device is composed of a plurality of stages of charge transfer units and an output unit that are cascaded together. Each stage of the charge transfer units includes a first node for input, a second node for output, a first circuit and a first capacitor. The first node or the second node is biased at a bias provided for the first circuit. Thereby, the first capacitors of the odd-numbered stage and the even-numbered stage of charge transfer units can respectively receive two clock signals that are mutually opposite in phase for complementary switching operating. Collocated with the switching of the output unit, an output voltage with a high negative level can be generated.

12 Claims, 9 Drawing Sheets

CHARGE PUMP DEVICE AND OPERATING METHOD THEREOF

BACKGROUND OF THE INVENTION

1. Field of the Invention

The present invention relates to a charge pump technology and, more particularly, to a charge pump device capable of eliminating the body effect and having a high pumping gain and an operating method thereof.

2. Description of Related Art

Negative voltages are required for general flash memories or electrically erasable programmable read only memories (EEPROM) to generate a sufficient relative potential difference for data erase or data programming function.

FIG. 1 shows a prior art charge pump device 10, which makes use of cascaded PMOS transistors to transfer charges in the load capacitor of the output node. The input node of this charge pump device 10 is grounded. The drain of each of the PMOS transistors P0~P4 is connected to the gate thereof. The PMOS transistors are cascaded together in the so-called diode-connected manner. All the substrates of the PMOS transistors P0~P4 are biased at the voltage level $V_{DD}$ of the power source. The input node and the drain of the transistor P0 are connected to the node D1. The source of the transistor P1 and the drain of the transistor P2 are connected to the node D2. The source of the transistor P2 and the drain of the transistor P3 are connected to the node D3. The source of the transistor P3 and the drain of the transistor P4 are connected to the node D4. The source of the transistor P4 is connected to the output node. The nodes D1~D4 are connected to capacitors C1~C4 (all of the same capacitance value of C), respectively.

Please refer to FIGS. 1(a) and 1(b) at the same time. The capacitors C1 and C3 are connected to a first clock signal A, and the capacitors C2 and C4 are connected to a second clock signal B. The first clock signal A and the second clock signals B are mutually opposite in phase, and change their signal levels between the voltage level of the power source and the ground level.

When the voltage level of the first clock signal A is at the voltage level $V_{DD}$ of the power source, the voltage levels of the nodes D1 and D3 are increased by $V_C = V_{DD} \times C/(CP+C)$ through the coupling of the capacitors C1 and C3, where CP is the parasitic capacitance value of the node D1 or D3. At the same time, the voltage level of the second clock signal B is at the ground level, and the voltage levels of the nodes D2 and D4 are decreased by $V_C = V_{DD} \times C/(CP+C)$ through the coupling of the capacitors C2 and C4, where CP is the parasitic capacitance value of the node D2 or D4. Because the voltage levels of the nodes D1 and D3 are raised while the voltage levels of the nodes D2 and D4 are lowered, the transistors P0, P2 and P4 are on, and currents flow from the nodes D1 and D3 and the output node to the input node (the ground terminal), and the nodes D2 and D4, respectively. Before the end of the voltage level $V_{DD}$ of the first clock signal A, the voltage levels of the nodes D1 and D3 and the output node will drop because charges in the capacitors C1 and C3 and the load capacitor Cout are transferred to the ground terminal and the capacitors C2 and C4, respectively.

On the contrary, when the voltage level of the first clock signal A is at the ground level, the voltage levels of the nodes D1 and D3 are decreased by $V_C = V_{DD} \times C/(CP+C)$ through the coupling of the capacitors C1 and C3. At the same time, the voltage level of the second clock signal B is at voltage level $V_{DD}$ of the power source, and the voltage levels of the nodes D2 and D4 are increased by $V_C = V_{DD} \times C/(CP+C)$ through the coupling of the capacitors C2 and C4. Because the voltage levels of the nodes D1 and D3 are lowered while the voltage levels of the nodes D2 and D4 are raised, the transistors P1 and P3 are on, and currents flow from the nodes D2 and D4 to the nodes D1 and D3, respectively. Before the end of the ground level of the first clock signal A, the voltage levels of the nodes D2 and D4 will drop because charges in the capacitors C2 and C4 and the load capacitor Cout are transferred to the capacitors C1 and C3, respectively. Therefore, through the continual interaction to the capacitors C1~C4 by the first clock signal A and the second clock signal B, the current constantly flows from the output node to the ground terminal to continually lower the voltage level of the output node, finally reaching the desired negative voltage.

The threshold voltages of the PMOS transistors of the above charge pump device 10 are raised because the potential difference between the substrate and the source ($V_{BS} = V_{DD} - V_S$ where $V_S$ is a negative voltage) is affected by the reduced voltage level of the source. This is the so-called body effect. An obvious body effect or a raised threshold voltage of a transistor will reduce the conduction performance (charge transfer efficiency) of the transistor. Higher threshold voltages of the PMOS transistors P0~P4 in FIG. 1(a) means more PMOS transistors are cascaded to cause an inferior charge transfer efficiency so as to be unable to provide an efficient load current. That is, the generated negative voltage is smaller (closer to the ground level, 0V).

FIG. 2(a) shows another prior art charge pump device 20. Reference is made to FIG. 2(b) as well as FIG. 2(a). The charge pump device 20 makes use of NMOS transistors to transfer charges in the load capacitor of the output node. The charge pump device 20 differs from the above charge pump device 10 in that the PMOS transistors P0~P4 of the charge pump device 10 are replaced with NMOS transistors N0~N4. The drain of each of the NMOS transistors N0~N4 is connected to the gate thereof. The NMOS transistors are cascaded together in the so-called diode-connected manner. The principle of operation of FIG. 2(a) is the same as that of FIG. 1(a). Therefore, the charge pump device 20 also has an obvious body effect or raised threshold voltages of transistor, hence lowering the conduction performance (charge transfer efficiency) of transistor. Accordingly, the present invention aims to propose a charge pump device and an operating method thereof in order to solve the above problems in the prior art.

SUMMARY OF THE INVENTION

The primary object of the present invention is to provide a charge pump device and an operating method thereof to eliminate the body effect for providing an output voltage with a high negative level and also have the advantage of a high pumping gain.

To achieve the above object, the present invention provides a charge pump device and an operating method thereof. The charge pump device comprises several stages of charge transfer units and an output unit that are cascaded between the input node and the output node of the charge pump device. Each of the charge transfer units comprises a first node for input, a second node for output, a first circuit connected to the first node and the second node, and a first capacitor connected to the second node. The first node of the first-stage charge transfer unit is connected to the input node. The first node and the second node of another stage of charge transfer units are connected to the second node and the first circuit of the previous-stage charge transfer unit. The output unit comprises a third node for input, a second circuit and a second capacitor connected to the second circuit. The second circuit is connected to the third node, the output node, the second capacitor, and the first circuit of the last-stage charge transfer unit.

Because providing a bias for the first circuit of a charge transfer unit can enable or disable the charge transfer unit, the first capacitor can be used to receive two clock signals of the same amplitude but opposite phases to let odd-numbered-stage and even-numbered-stage charge transfer units perform complementary switching operations. That is, odd-numbered-stage charge transfer units provide the charge transfer function while even-numbered-stage charge transfer units don't (or vice versa), and their switching states are alternately changed. Collocated with the switching operation of the output unit, an output voltage with a high negative level can finally be generated.

BRIEF DESCRIPTION OF THE DRAWINGS

The various objects and advantages of the present invention will be more readily understood from the following detailed description when read in conjunction with the appended drawing, in which.

DETAILED DESCRIPTION OF THE PREFERRED EMBODIMENTS

Figure 1A:
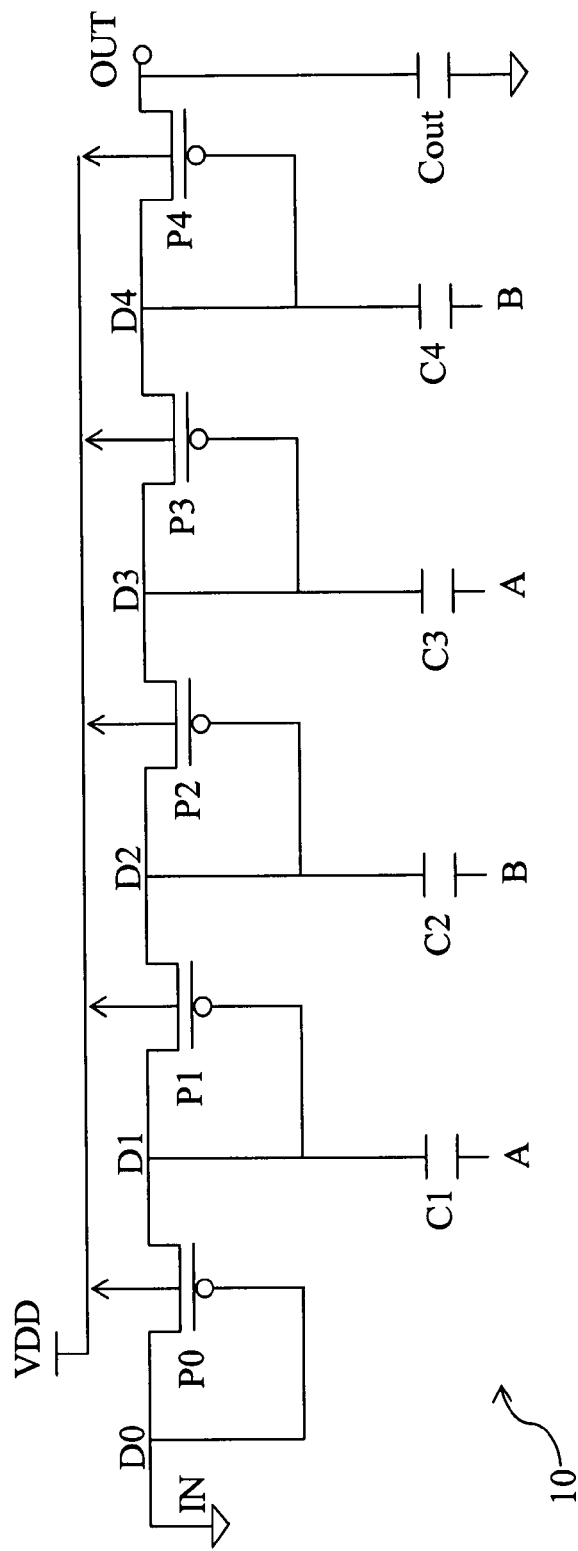
FIG. 1(a) is a diagram of a prior art charge pump device.
Figure 1B:
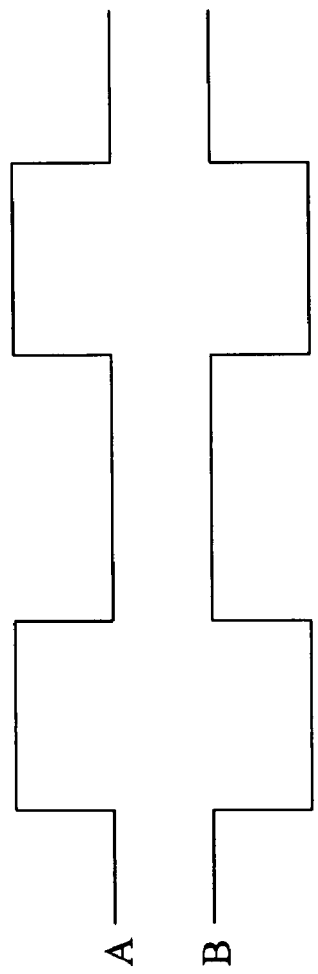
FIG. 1(b) is a diagram of the clock signal applied to the charge pump device of FIG. 1(a)
Figure 2A:
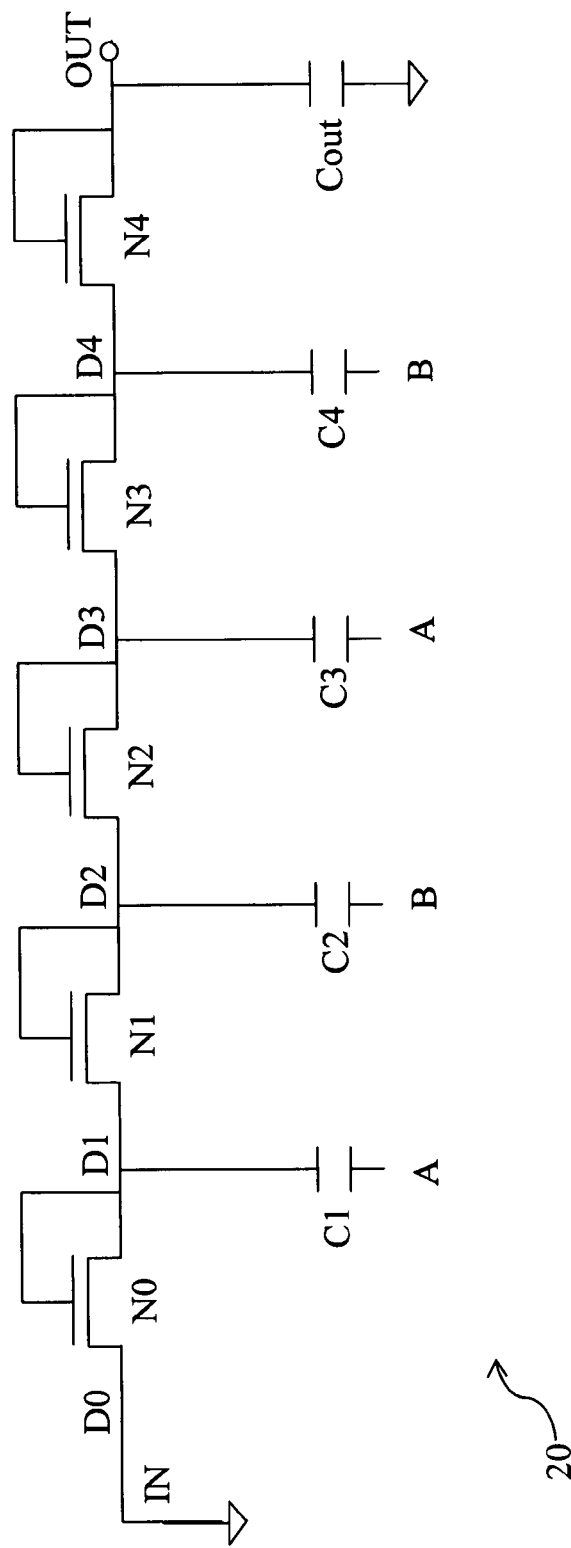
FIG. 2(a) is a diagram of another prior art charge pump device.
Figure 2B:
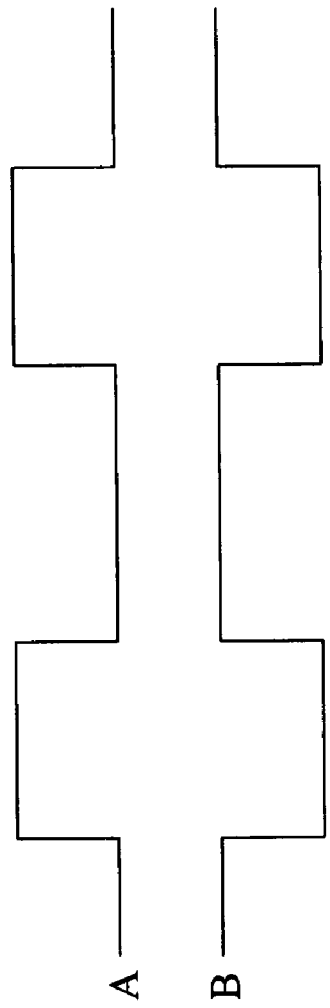
FIG. 2(b) is a diagram of the clock signal applied to the charge pump device of FIG. 2(a)
Figure 3A:
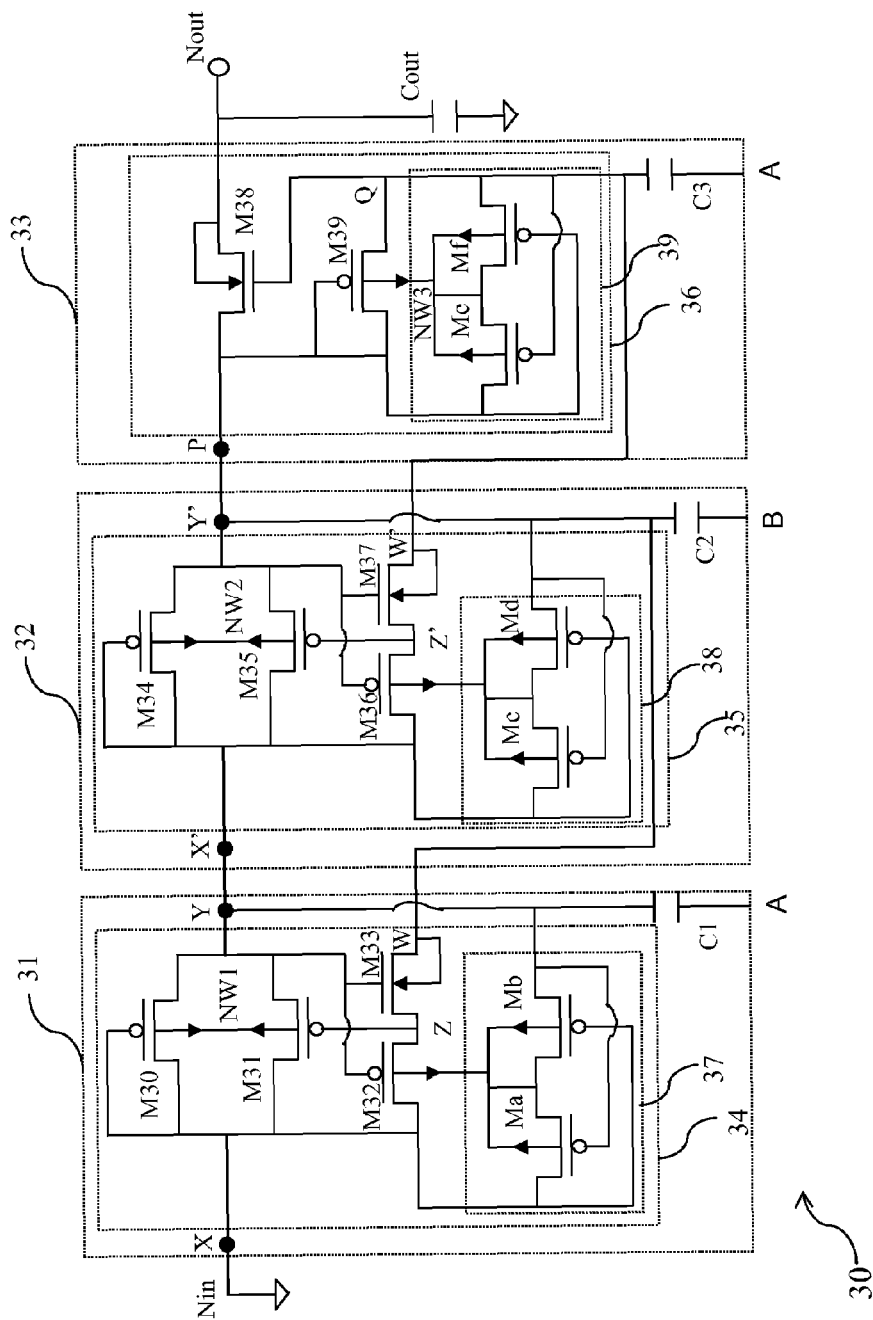
FIG. 3(a) is a diagram of a charge pump device according to a first embodiment of the present invention.

FIG. 3(a) is a diagram of a charge pump device according to the first embodiment of the present invention. Please also refer to FIG. 3(b). A charge pump device 30 is composed of a first-stage charge transfer unit 31, a second-stage charge transfer unit 32 and an output unit 33 that are cascaded between an input node Nin and an output node Nout. In order to get a negative voltage, the voltage level of the power source connected to the input node Nin is at the ground level, and the output node is used to provide the output voltage.

Each stage of charge transfer units comprises a first node X (X'), a second node Y (Y'), a first circuit 34 (35) connected between the two nodes, and a first capacitor C1 (C2) connected to the second node Y (Y'). The first circuit 34 (35) includes a fourth node Z (Z'), a fifth node W (W'), an eighth node NW1 (NW2), a first transistor M30 (M34), a second transistor M31 (M35), a third transistor M32 (M36), a fourth transistor M33 (M37), and a first well bias circuit 37 (38). All of the first transistor M30 (M34), the second transistor M31 (M35), the third transistor M32 (M36) are PMOS transistors. The fourth transistor M33 (M37) is an NMOS transistor. The first well bias circuit 37 (38) includes a ninth transistor Ma (Mc) and a tenth transistor Mb (Md). Both of the ninth transistor Ma (Mc) and the tenth transistor Mb Me (Md) are PMOS transistors. The function of the first well bias circuit 37 (38) is to provide a bias for the eighth node NW1 (NW2). The drain and gate of the first transistor M30 (M34) are connected to the first node X (X'), the source thereof is connected to the second node Y (Y'), and the substrate thereof is connected to the eighth node NW1 (NW2). The drain of the second transistor M31 (M35) is connected to the first node X (X'), the gate thereof is connected to the fourth node Z (Z'), the source thereof is connected to the second node Y (Y'), and the substrate thereof is connected to the eighth node NW1 (NW2). The drain of the third transistor M32 (M36) is connected to the fourth node Z (Z'), the gate thereof is connected to the second node Y (Y'), the source thereof is connected to the first node X (X'), and the substrate thereof is connected to the eighth node NW1 (NW2). The source and substrate of the fourth transistor M33 (M37) are connected to the fifth node W (W'), the gate thereof is connected to the second node Y (Y'), and the drain thereof is connected to the fourth node Z (Z'). The drain and substrate of the ninth transistor Ma (Mc) are connected to the eighth node NW1 (NW2), the gate thereof is connected to the second node Y (Y'), and the source thereof is connected to the first node X (X'). The drain and substrate of the tenth transistor Mb (Md) are connected to the eighth node NW1 (NW2), the gate thereof is connected to the first node X (X'), and the source thereof is connected to the second node Y (Y'). Moreover, the second node Y' of the second-stage charge transfer unit 32 is connected to the fifth node W of the first-stage charge transfer unit 31. Besides, the first capacitors C1 and C2 are connected to a clock control unit (not shown) to receive a first clock signal A and a second clock signal B that are mutually opposite in phase, respectively.

The output unit 33 comprises a third node P, a second circuit 36, and a second capacitor C3. The second circuit 36 includes a sixth node Q, a seventh node NW3, a fifth transistor Me, a sixth transistor Mf, a seventh transistor M39, and an eighth transistor M38. All of the fifth transistor Me, the sixth transistor Mf and the seventh transistor M39 are PMOS transistors. The eighth transistor M38 is an NMOS transistor. A second well bias circuit 39 is composed of the fifth transistor Me and the sixth transistor Mf to provide a second bias for the seventh node NW3. The third node P is connected to the second node Y' of the second-stage charge transfer unit 32. The drain and substrate of the fifth transistor Me are connected to the seventh node NW3, the gate thereof is connected to the sixth node Q, and the source thereof is connected to the third node P. The drain and substrate of the sixth transistor Mf are connected to the seventh node NW3, the gate thereof is connected to the third node P, and the source thereof is connected to the sixth node Q. The drain and gate of the seventh transistor M39 are connected to the third node P, the source thereof is connected to the sixth node Q, and the substrate thereof is connected to the seventh node NW3. The drain and substrate of the eighth transistor M38 are connected to the output node Nout of the charge pump device 30, the gate thereof is connected to the sixth node Q, and the source thereof is connected to the sixth node P. The second capacitor C3 is connected to the sixth node Q and the first clock signal A.

Figure 3B:
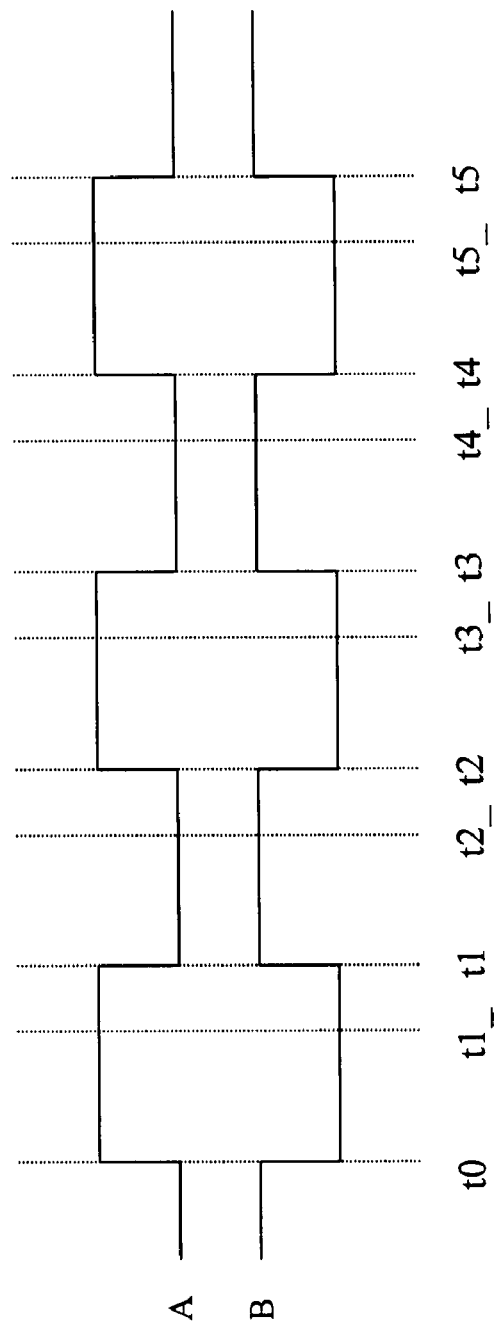
FIG. 3(b) is a diagram of the clock signal applied to the charge pump device of the first embodiment of the present invention.

The actions of each component in the above embodiment at different times will be illustrated below with reference to FIGS. 3(a) and 3(b).

Assume the amplitude of voltage level of the first clock signal A and the second clock signal B is $V_{DD}$, the coupling effect of the first capacitors C1 and C2 and the second capacitor C3 is 100%. The first clock signal A and the second clock signal B are used to switch the charge transfer units 31 and 32 and the output unit 33 between a first mode and a second mode.

(1) t=0

At the beginning, the first node X (connected to the input node Nin) of the first-stage charge transfer unit 31 is grounded, the voltage level of the second node Y of the first-stage charge transfer unit 31 is $V_{Y0}$, the voltage level of the second node Y' of the second-stage charge transfer unit 32 is equal to that of the third node P of the output unit 33 (both being $V_{P0}$), the voltage level of the sixth node Q of the output unit 33 is $V_{Q0}$, the voltage level of the output node Nout is $V_{OUT0}$.

(2) t=$t_0$ (the first mode)

At time to, the first clock signal A rises from the low level to the high level, while the second clock signal B drops from the high level to the low level. The increase of the voltage level of the first clock signal A is $V_{DD}$. Through the coupling effect of the first capacitor C1, the voltage level of the second node Y of the first-stage charge transfer unit 31 is also increased by $V_{DD}$, i.e., $V_{Y,t0}=V_{Y0}+V_{DD}$. Similarly, through the coupling effect of the second capacitor C3, the voltage level of the sixth node Q of the output unit 33 is also increased by $V_{DD}$, i.e., $V_{Q,t0}=V_{Q0}+V_{DD}$. The decrease of the voltage level of the second clock signal B is $V_{DD}$. Through the coupling effect of the first capacitor C2, the voltage level of the second node Y' of the second-stage charge transfer unit 32 is also decreased by $V_{DD}$, i.e., $V_{Y',t0}=V_{P,t0}=V_{P0}-V_{DD}$. The actions of the charge transfer units 31 and 32 and the output unit 33 will be illustrated in detail below.

(a) the first-stage charge transfer unit 31

In the first well bias circuit 37, the ninth transistor Ma is off because the relative potential between the source and gate thereof is lower than the threshold voltage $|V_{tp0}|$ of PMOS transistor (i.e., $V_{SG,Ma}=V_{X,t0}-V_{Y,t0}=0-(V_{Y0}+V_{DD})<|V_{tp0}|$), the tenth transistor Mb is on because the relative potential between the source and gate thereof is higher than the threshold voltage $|V_{tp0}|$ (i.e., $V_{SG,Mb}=V_{Y,t0}-V_{X,t0}=V_{Y0}+V_{DD}>|V_{tp0}|$). Therefore, the voltage level of the eighth node NW1 is equal to that of the second node Y (i.e., $V_{NW1}=V_{Y0}+V_{DD}$). In other words, the first well bias circuit 37 lets the substrates of all the PMOS transistors (including the first transistor M30, the second transistor M31, the third transistor M32, the ninth transistor Ma and the tenth transistor Mb) of the first-stage charge transfer unit 31 be biased at the second node Y having a higher voltage level in the first-stage charge transfer unit 31. Because there is no relative potential between the source and gate of the first transistor M30, the second transistor M31, the third transistor M32, the ninth transistor Ma and the tenth transistor Mb, their threshold voltage is equal to $|V_{tp0}|$, i.e., the threshold voltage when there is no body effect. The first transistor M30 is on because the relative potential between the source and gate thereof is higher than the threshold voltage $|V_{tp0}|$ (i.e., $V_{SG,M30}=V_{Y,t0}-V_{X,t0}=V_{Y0}+V_{DD}>|V_{tp0}|$). A current flows from the second node Y to the first node X, and charges are transferred from the first capacitor C1 to the first node X (i.e., the ground terminal). Before t=t1 (i.e., t=$t_{1\_}$, the voltage level of the second node Y will be steadily held at $|V_{tp0}|$ (i.e., $V_{Y,t1\_}=|V_{tp0}|$). The charge transfer efficiency of the first transistor M30 is equal to $(V_{Y0}+V_{DD}-V_{Y,t1\_})/V_{DD}$. If $V_{Y,t1\_}$ can be reduced, the charge transfer efficiency of the first-stage charge transfer unit 31 can be further improved. The third transistor M32 is off because the relative potential between the source and gate thereof is lower than the threshold voltage $|V_{tp0}|$ of PMOS transistor (i.e., $V_{SG,M32}=V_{X,t0}-V_{Y,t0}=0-(V_{Y0}+V_{DD})<|V_{tp0}|$). The fourth transistor M33 is on because the relative potential between the gate and source thereof is higher than the threshold voltage $V_{tN}$ of NMOS transistor (i.e., $V_{GS,M33}=V_{Y,t0}-V_{P,t0}=(V_{Y0}+V_{DD})-(V_{P0}-V_{DD})=2V_{DD}+V_{Y0}-V_{P0}>V_{tN}$). The voltage level of the fourth node Z is therefore equal to that of the second node Y' (i.e., $V_Z=V_{P0}-V_{DD}=V_{G,M31}<0V$). Because the voltage level of the gate of the second transistor M31 is lower than that of the gate of the first transistor M30, the second transistor M31 has a superior charge transfer efficiency than does the first transistor M30, and the voltage level of the second node Y is lower than $|V_{tp0}|$ and even close to 0V (i.e., $V_{Y,t1\_}\approx 0V$). Therefore, the second transistor M31 can assist the first transistor M30 in enhancing the charge transfer efficiency of the first-stage charge transfer unit 31.

(b) the second-stage charge transfer unit 32

The ninth transistor Mc is on because the relative potential between the source and gate thereof is higher than the threshold voltage of PMOS transistor $|V_{tp0}|$ (i.e., $V_{SG,Mc}=V_{Y,t0}-V_{P,t0}=(V_{Y0}+V_{DD})-(V_{P0}-V_{DD})=2V_{DD}+V_{Y0}-V_{P0}>|V_{tp0}|$). The tenth transistor Md is off because the relative potential between the source and gate thereof is lower than the threshold voltage $|V_{tp0}|$ (i.e., $V_{SG,Md}=V_{P,t0}-V_{Y,t0}=(V_{P0}-V_{DD})-(V_{Y0}+V_{DD})=V_{P0}-V_{Y0}-2V_{DD}<|V_{tp0}|$). The voltage level of the eighth node NW2 is therefore equal to that of the second node X' (i.e., $V_{NW2}=V_{Y'0}+V_{DD}$). In other words, the first well bias circuit 38 lets the substrates of all the PMOS transistors (including the first transistor M34, the second transistor M35, the third transistor M36, the ninth transistor Mc and the tenth transistor Md) of the second-stage charge transfer unit 32 be biased at the second node X' having a higher voltage level in the second-stage charge transfer unit 32. Because there is no relative potential between the source and gate of the first transistor M34, the second transistor M35, the third transistor M36, the ninth transistor Mc and the tenth transistor Md, their threshold voltage is equal to $|V_{tp0}|$, i.e., the threshold voltage when there is no body effect. The first transistor M34 is off because the relative potential between the source and gate thereof is lower than the threshold voltage $|V_{tp0}|$ (i.e., $V_{SG,M34}=V_{P,t0}-V_{Y,t0}=(V_{P0}-V_{DD})-(V_{Y0}+V_{DD})=V_{P0}-V_{Y0}-2V_{DD}<|V_{tp0}|$). The third transistor M36 is on because the relative potential between the source and gate thereof is higher than the threshold voltage $|V_{tp0}|$ (i.e., $V_{SG,M36}=V_{Y,t0}-V_{P,t0}=(V_{Y0}+V_{DD})-(V_{P0}-V_{DD})=2V_{DD}+V_{Y0}-V_{P0}>|V_{tp0}|$). The fourth transistor M37 is off because the relative potential between the gate and source thereof is lower than the threshold voltage of NMOS transistor $V_{tN}$ (i.e., $V_{GS,M37}=V_{P,t0}-V_{Q,t0}=(V_{P0}-V_{DD})-(V_{Q0}+V_{DD})=(V_{P0}-V_{Y0})-2V_{DD}<V_{tN}$). The second transistor M35 is off because the voltage level of the gate thereof is equal to that of the second node Y (i.e., $V_{G,M35}=V_{Y}=V_{Y0}+V_{DD}$) and the relative potential between the source and gate thereof is lower than the threshold voltage of PMOS transistor $|V_{tp0}|$ (i.e., $V_{SG,M35}=V_{P,t0}-V_{G,M35}=(V_{P0}-V_{DD})-(V_{Y0}+V_{DD})=(V_{P0}-V_{Y0})-2V_{DD}<|V_{tp0}|$). At t=t0, because both the first transistor M34 and the second transistor M35 are off, the second-stage charge transfer unit 32 has no charge transfer function.

(c) the output unit 33

The fifth transistor Me is off because the relative potential between the source and gate thereof is lower than the threshold voltage of PMOS transistor $|V_{tp0}|$ (i.e., $V_{SG,Me}=V_{P,t0}-V_{Q,t0}=(V_{P0}-V_{DD})-(V_{Q0}+V_{DD})=V_{P0}-V_{Q0}-2V_{DD}<|V_{tp0}|$). The sixth transistor Mf is on because the relative potential between the source and gate thereof is higher than the threshold voltage $|V_{tp0}|$ (i.e., $V_{SG,Mf}=V_{Q,t0}-V_{P,t0}=(V_{Q0}+V_{DD})-(V_{P0}-V_{DD})=2V_{DD}+V_{Q0}-V_{P0}>|V_{tp0}|$). The voltage level of the seventh node NW3 is equal to that of the sixth node Q (i.e., $V_{NW3}=V_{Q0}+V_{DD}$). Because there is no relative potential between the source and gate of the fifth transistor Me, the sixth transistor Mf and the seventh transistor M39, their threshold voltage is equal to $|V_{tp0}|$, i.e., the threshold voltage when there is no body effect. The seventh transistor M39 is on because the relative potential between the source and gate thereof is higher than the threshold voltage $|V_{tp0}|$ (i.e., $V_{SG,M39}=V_{Qt0}-V_{Pt0}=(V_{Q0}+V_{DD})-(V_{P0}-V_{DD})=2V_{DD}+V_{Q0}-V_{P0}>|V_{tp0}|$). The eighth transistor M38 is on because the relative potential between the gate and source thereof is higher than the threshold voltage $V_{tN}$ of NMOS transistor (i.e., $V_{GS,M38}=V_{Q,t0}-V_{P,t0}=(V_{Q0}+V_{DD})-(V_{P0}-V_{DD})=2V_{DD}+V_{Q0}-V_{P0}>V_{tN}$). Therefore, a current flows from the output node Nout to the third node P, and charges are transferred from a load capacitor Cout to the first capacitor C2. Before t1 (t=t1_, the voltage level of the output node Nout of the charge pump device 30 will gradually decrease from the initial value $V_{OUT0}$ to be steadily held at $V_{P0}-V_{DD}$, i.e., $V_{OUT1\_}=V_{P0}-V_{DD}, V_{Pt1\_}=V_{P0}-V_{DD}, V_{Qt1\_}=V_{P0}-V_{DD}+|V_{tp0}|$.

(3) t=t1 (the second mode)

At time t1, the first clock signal A drops from the high level to the low level, while the second clock signal B rises from the low level to the high level. The decrease of the voltage level of the first clock signal A is $V_{DD}$. Through the coupling effect of the first capacitor C1, the voltage level of the second node Y of the first-stage charge transfer unit 31 is also decreased by $V_{DD}$, i.e., $V_{Y,t1}=V_{Y,t1}-V_{DD}=0-V_{DD}$. Similarly, through the coupling effect of the second capacitor C3, the voltage level of the sixth node Q of the output unit 33 is also decreased by $V_{DD}$, i.e., $V_{Q,t1}=V_{Q,t1\_}-V_{DD}=(V_{P0}-V_{DD}+|V_{tp0}|)-V_{DD}=V_{P0}-2V_{DD}+|V_{tp0}|$. The increase of the voltage level of the second clock signal B is $V_{DD}$. Through the coupling effect of the first capacitor C2, the voltage level of the second node Y' of the second-stage charge transfer unit 32 is also increased by $V_{DD}$, i.e., $V_{P,t1}=V_{P,t1\_}+V_{DD}=V_{P0}-V_{DD}+V_{DD}=V_{P0}$.

(a) the first-stage charge transfer unit 31

The ninth transistor Ma is on because the relative potential between the source and gate thereof is higher than the threshold voltage $|V_{tp0}|$ of PMOS transistor (i.e., $V_{SG,Ma=VX,t1}-V_{Y,t1}=0-(-V_{DD})=V_{DD}>|V_{tp0}|$). The tenth transistor Mb is off because the relative potential between the source and gate thereof is lower than the threshold voltage $|V_{tp0}|$ (i.e., $V_{SG,Mb}=V_{Y,t1}-V_{X,t1}=-V_{DD}<|V_{tp0}|$). Therefore, the voltage level of the eighth node NW1 is equal to that of the first node X (i.e., $V_{NW1}=0V$). In other words, the first well bias circuit 37 lets the substrates of all the PMOS transistors (including the first transistor M30, the second transistor M31, the third transistor M32, the ninth transistor Ma and the tenth transistor Mb) of the first-stage charge transfer unit 31 be biased at the first node X (i.e., the input node Nin) having a higher voltage level in the first-stage charge transfer unit 31. Because there is no relative potential between the source and gate of the first transistor M30, the second transistor M31, the third transistor M32, the ninth transistor Ma and the tenth transistor Mb, their threshold voltage is equal to $|V_{tp0}|$, i.e., the threshold voltage when there is no body effect. The first transistor M30 is off because the relative potential between the source and gate thereof is lower than the threshold voltage $|V_{tp0}|$ (i.e., $V_{SG,M30}=V_{Y,t1}-V_{X,t1}=-V_{DD}<|V_{tp0}|$). The third transistor M32 is on because the relative potential between the source and gate thereof is higher than the threshold voltage $|V_{tp0}|$ (i.e., $V_{SG,M32}=V_{X,t1}-V_{Y,t1}=0-(-V_{DD})=V_{DD}>|V_{tp0}|$). The fourth transistor M33 is off because the relative potential between the gate and source thereof is lower than the threshold voltage of NMOS transistor $V_{tN}$ (i.e., $V_{GS,M33}=V_{Y,t1}-V_{P,t1}=(-V_{DD})-V_{P0}<V_{tN}$). The second transistor M31 is off because the voltage level of the gate thereof is equal to that of the first node X (i.e., $V_{G,M31}=0V$) and the relative potential between the source and gate thereof is lower than the threshold voltage of PMOS transistor $|V_{tp0}|$ (i.e., $V_{SG,M31}=V_{Y,t1}-V_{X,t1}=-V_{DD}<|V_{tp0}|$). At t=t1, because both the first transistor M30 and the second transistor M31 are off, the first-stage charge transfer unit 31 has no charge transfer function.

(b) the second-stage charge transfer unit 32

The ninth transistor Mc is off because the relative potential between the source and gate thereof is lower than the threshold voltage |Vtpo| of PMOS transistor (i.e., $V_{SG,Mc}=V_{Y,t1}-V_{P,t1}=-V_{DD}-V_{P0}<|V_{tp0}|$). The tenth transistor Md is on because the relative potential between the source and gate thereof is higher than the threshold voltage $|V_{tp0}|$ (i.e., $V_{SG,Md}=V_{P,t1}-V_{Y,t1}=V_{P0}-(-V_{DD})>|V_{tp0}|$). Therefore, the voltage level of the eighth node NW2 is equal to that of the third node P (i.e., $V_{NW2}=V_{P0}$). In other words, the first well bias circuit 37 lets the substrates of all the PMOS transistors (including the first transistor M34, the second transistor M35, the third transistor M36, the ninth transistor Mc and the tenth transistor Md) of the second-stage charge transfer unit 32 be biased at the second node Y' having a higher voltage level in the second-stage charge transfer unit 32. Because there is no relative potential between the source and gate of the first transistor M34, the second transistor M35, the third transistor M36, the ninth transistor Mc and the tenth transistor Md, their threshold voltage is equal to $|V_{tp0}|$, i.e., the threshold voltage when there is no body effect. The first transistor M34 is on because the relative potential between the source and gate thereof is higher than the threshold voltage $|V_{tp0}|$ (i.e., $V_{SG,M34}=V_{P,t1}-V_{Y,t1}=V_{P0}-(-V_{DD})>|V_{tp0}|$). A current flows from the second node Y' to the first node X', and charges are transferred from the first capacitor C2 to the first capacitor C1. Before t=t2 (i.e., t=t2_, the voltage level of the second node Y' (also the third node P of the output unit 33) will be steadily held at $|V_{tp0}|-V_{DD}$ (i.e., $V_{P,t2\_}=|V_{tp0}|-V_{DD}$). The charge transfer efficiency of the first transistor M34 is equal to $(V_{P,t1\_}-V_{P,t2\_})V_{DD}$. If $V_{P,t2\_}$ can be reduced, the charge transfer efficiency of the second-stage charge transfer unit 32 can be further improved. The third transistor M36 is off because the relative potential between the source and gate thereof is lower than the threshold voltage |Vtpo| of PMOS transistor (i.e., $V_{SG,M36}=V_{Y,t1}-V_{P,t1}=-V_{DD}-V_{P0}<|V_{tp0}|$). The fourth transistor M37 is on because the relative potential between the gate and source thereof is higher than the threshold voltage $V_{tN}$ of NMOS transistor (i.e., $V_{GS,M37}=V_{P,t1}-V_{Q,t1}=V_{P0}-(V_{P0}-2V_{DD}+V_{tp0}|)=2V_{DD}-|V_{tp0}|>V_{tN}$). The voltage level of the gate of the second transistor M35 is equal to that of the sixth node Q (i.e., $V_{G,M35}=V_{P0}-2V_{DD}+|V_{tp0}|<V_{G,M34}=-V_{DD}$). Because the voltage level of the gate of the second transistor M35 is lower than that of the gate of the first transistor M34, the second transistor M35 has a superior charge transfer efficiency than does the first transistor M34, and the voltage level of the third node P is lower than $|V_{tp0}|-V_{DD}$ and even close to $-V_{DD}$ (i.e., $V_{P,t2} \approx -V_{DD}$). Therefore, the second transistor M35 can assist the first transistor M34 in enhancing the charge transfer efficiency of the second-stage charge transfer unit 32.

(c) the output unit 33

The fifth transistor Me is on because the relative potential between the source and gate thereof is higher than the threshold voltage of PMOS transistor $|V_{tp0}|$ (i.e., $V_{SG,Me}=V_{P,t1}-V_{Q,t1}=V_{P0}-(V_{P0}-2V_{DD}+|V_{tp0}|)= 2V_{DD}-|V_{tp0}|>|V_{tp0}|$). The sixth transistor Mf is off because the source and gate thereof is lower than the threshold voltage $|V_{tp0}|$ (i.e., $V_{SG,Mf}=V_{Q,t1}-V_{P,t1}=(V_{P0}-2V_{DD}+|V_{tp0}|)-V_{P0}=|V_{tp0}|-2V_{DD}<|V_{tp0}|$). The voltage level of the seventh node NW3 is equal to that of the third node P (i.e., $V_{NW3}=V_{P0}$). In other words, the second well bias circuit 39 lets the substrates of all the PMOS transistors (including the fifth transistor Me, the sixth transistor Mf and the seventh transistor M39) of the output unit 33 be biased at the third node P having a higher voltage level in the output unit 33. Because there is no relative potential between the source and gate of the fifth transistor Me, the sixth transistor Mf and the seventh transistor M39, their threshold voltage is equal to $|V_{tp0}|$, i.e., the threshold voltage when there is no body effect. The seventh transistor M39 is off because the relative potential between the source and gate thereof is lower than the threshold voltage $|V_{tp0}|$ (i.e., $V_{SG,M39}=V_{Q,t1}-V_{P,t1}=(V_{P0}-2V_{DD}+|V_{tp0}|)-V_{P0}=|V_{tp0}|-2V_{DD}<|V_{tp0}|$). The eighth transistor M38 is off because the relative potential between the gate and source thereof is lower than the threshold voltage $V_{tN}$ of NMOS transistor (i.e., $V_{GS,M38}=V_{Q,t1}-V_{P,t1}=(V_{P0}-2V_{DD}+|V_{tp0}|)-V_{P0}=|V_{tp0}|-2V_{DD}<V_{tN}$). Therefore, the output unit 33 has no charge transfer function, and $V_{OUT\_}=V_{OUT\_}=V_{P0}-V_{DD}, V_{Qt2\_}=V_{P0}-2V_{DD}+|V_{tp0}|$.

(4) t=t2 (the first mode)

At time t2, the first clock signal A rises from the low level to the high level, while the second clock signal B drops from the high level to the low level. The increase of the voltage level of the first clock signal A is $V_{DD}$. Through the coupling effect of the first capacitor C1, the voltage level of the second node Y of the first-stage charge transfer unit 31 is also increased by $V_{DD}$, i.e., $V_{Y,t2}=V_{Yt2\_}+V_{DD}=-V_{DD}+V_{DD}=0V$. Similarly, through the coupling effect of the second capacitor C3, the voltage level of the sixth node Q of the output unit 33 is also increased by $V_{DD}$, i.e., $V_{Q,t2}=V_{Qt2\_}+V_{DD}=(V_{P0}-2V_{DD}+|V_{tp0}|)+V_{DD}=V_{P0}-V_{DD}+|V_{tp0}|$. The decrease of the voltage level of the second clock signal B is $V_{DD}$. Through the coupling effect of the first capacitor C2, the voltage level of the second node Y' (also the third node P of the output unit 33) of the second-stage charge transfer unit 32 is also decreased by $V_{DD}$, i.e., $V_{P,t2}=V_{P,t2\_}-V_{DD}=-V_{DD}-V_{DD}=-2V_{DD}$.

(a) the first-stage charge transfer unit 31

$V_{Y,t2}=V_{X,t2}=0V$ meaning the second node Y of the first-stage charge transfer unit 31 changes with the first clock signal A between 0V and $-V_{DD}$ to completely transfer charges from the second-stage charge transfer unit 32.

(b) the second-stage charge transfer unit 32

The ninth transistor Mc is on because $V_{SG,Mc}=V_{Y,t2}-V_{P,t2}=0-(-2V_{DD})=2V_{DD}>|V_{tp0}|$. The tenth transistor Md is off because $V_{SG,Md}=V_{P,t2}-V_{Y,t2}=-2V_{DD}<|V_{tp0}|$. The voltage level of the eighth node NW2 is therefore equal to that of the first node X' (also the second node Y), i.e., $V_{NW2}=V_{Y,t2}=0V$. The first transistor M34 is off because $V_{SG,M34}=V_{P,t2}-V_{Y,t2}=-2V_{DD}<|V_{tp0}|$. The third transistor M36 is on because $V_{SG,M36}=V_{Y,t2}-V_{P,t2}=0-(-2V_{DD})=2V_{DD}>|V_{tp0}|$. The fourth transistor M37 is off because $V_{GS,M37}=V_{P,t2}-V_{Q,t2}=(-2V_{DD})-(V_{P0}-V_{DD}+|V_{tp0}|)=-V_{P0}-V_{DD}-|V_{tp0}|<V_{tN}$. The second transistor M35 is off because $V_{SG,M35}=V_{P,t2}-V_{S,M35}=V_{P,t2}-V_{Y,t2}=-2V_{DD}<|V_{tp0}|$. At t=t2, because both the first transistor M34 and the second transistor M35 are off, the second-stage charge transfer unit 32 has no charge transfer function.

(c) the output unit 33

The fifth transistor Me is off because $V_{SG,Me}=V_{P,t2}-V_{Q,t2}=(-2V_{DD})-(V_{P0}-V_{DD}+|V_{tp0}|)=-|V_{tp0}|-V_{P0}-V_{DD}<|V_{tp0}|$. The sixth transistor Mf is on because $V_{SG,Mf}=V_{Q,t2}-V_{P,t2}=(V_{P0}-V_{DD}+|V_{tp0}|)-(-2V_{DD})=V_{DD}+|V_{tp0}|+V_{P0}>|V_{tp0}|$. The voltage level of the seventh node NW3 is equal to that of the sixth node Q (i.e., $V_{NW3}=V_{P0}-V_{DD}+|V_{tp0}|$). The seventh transistor M39 is on because $V_{SG,M39}=V_{Q,t2}-V_{P,t2}=(V_{P0}-V_{DD}+|V_{tp0}|)-(-2V_{DD})=V_{DD}+|V_{tp0}|+V_{P0}>|V_{tp0}|$. The eighth transistor M38 is on because $V_{GS,M38}=V_{Q,t2}-V_{P,t2}=V_{DD}+|V_{tp0}|+V_{P0}>V_{tN}$. Therefore, a current flows from the output node Nout to the third node P, and charges are transferred from the load capacitor Cout to the first capacitor C2. Before t3 (t=t3_), the voltage level of the output node Nout of the charge pump device 30 will gradually decrease from the $V_{OUT,t2}=V_{P0}-V_{DD}$ to be steadily held at $-2V_{DD}$, i.e., $V_{OUT3\_}=-2V_{DD}, V_{Pt3_{13}}=-2V_{DD}, V_{Qt3\_}=-2V_{DD}+|V_{tp0}|$.

(5) t=t3 (the second mode)

At time t3, the first clock signal A drops from the high level to the low level, while the second clock signal B rises from the low level to the high level. The decrease of the voltage level of the first clock signal A is $V_{DD}$. Through the coupling effect of the first capacitor C1, the voltage level of the second node Y of the first-stage charge transfer unit 31 is also decreased by $V_{DD}$, i.e., $V_{Y,t3}=V_{Yt3\_}-V_{DD}=0-V_{DD}$. Similarly, through the coupling effect of the second capacitor C3, the voltage level of the sixth node Q of the output unit 33 is also decreased by $V_{DD}$, i.e., $V_{Q,t3}=V_{Q,t3}-V_{DD}=(-2V_{DD}+|V_{tp0}|)-V_{DD}=-3V_{DD}+|V_{tp0}|$. The increase of the voltage level of the second clock signal B is $V_{DD}$. Through the coupling effect of the first capacitor C2, the voltage level of the second node Y' of the second-stage charge transfer unit 32 is also increased by $V_{DD}$, i.e., $V_{P,t3}=V_{P,t3\_}+V_{DD}=(-2V_{DD})+V_{DD}=-V_{DD}$.

(a) the first-stage charge transfer unit 31

The ninth transistor Ma is on because $V_{SG,Ma}=V_{X,t3}-V_{Y,t3}=0-(-V_{DD})=V_{DD}>|V_{tp0}|$. The tenth transistor Mb is off because $V_{SG,Mb}=V_{Y,t3}-V_{X,t3}=(-V_{DD})-0<|V_{tp0}|$. Therefore, the voltage level of the eighth node NW1 is equal to that of the first node X (i.e., $V_{NW1}=0V$). The first transistor M30 is off because $V_{SG,M30}=V_{Y,t3}-V_{X,t3}=-V_{DD}<|V_{tp0}|$. The third transistor M32 is on because $V_{SG,M32=VX,t3}-V_{Y,t3}=0-(-V_{DD})=V_{DD}>|V_{tp0}|$. The fourth transistor M33 is off because $V_{GS,M33}=V_{Y,t3}-V_{P,t3}=(-V_{DD})-V_{P0}<V_{tN}$. The second transistor M31 is off because the voltage level of the gate thereof is equal to that of the first node X (0V) and the relative potential between the source and gate thereof is lower than the threshold voltage of PMOS transistor $|V_{tp0}|$ (i.e., $V_{SG,M31}=V_{Y,t3}-V_{X,t3}=-V_{DD}<|V_{tp0}|$). At t=t3, because both the first transistor M30 and the second transistor M31 are off, the first-stage charge transfer unit 31 has no charge transfer function.

(b) the second-stage charge transfer unit 32

$V_{Y,t3}=V_{P,t3}=0V$, meaning the second node Y' changes with the second clock signal B between $-V_{DD}$ and $-2V_{DD}$ to completely transfer charges from the output unit 33.

(c) the output unit 33

The fifth transistor Me is on because $V_{SG,Me}=V_{P,t3}-V_{Q,t3}=-V_{DD}-(-3V_{DD}+|V_{tp0}|)=2V_{DD}-|V_{tp0}|>|V_{tp0}|$. The sixth transistor Mf is off because $V_{SG,Mf}=V_{Q,t3}-VPt3=(-3V_{DD}+|V_{tp0}|)-(-V_{DD})=|V_{tp0}|-2V_{DD}<|V_{tp0}|$. The voltage level of the seventh node NW3 is equal to that of the third node P (i.e., $V_{NW3}=V_{P,t3}=-V_{DD}$). The seventh transistor M39 is off because $V_{SG,M39}=V_{Q,t3}-V_{P,t3}=(-3V_{DD}+|V_{tp0}|)-(-V_{DD})=|V_{tp0}|-2V_{DD}<|V_{tp0}|$. The eighth transistor M38 is off because $V_{GS,M38}=V_{Q,t3}-V_{Pt,3}=(-3V_{DD}+|V_{tp0}|)-(-V_{DD})=|V_{tp0}|-2V_{DD}<V_{tN}$. Therefore, the output unit 33 has no charge transfer function, and $V_{OUT4}-V_{OUT3}=-2V_{DD}$, $V_{Qt4}-V_{Q,t3}=-3V_{DD}+|V_{tp0}|$.

(6) t=t4 (the first mode)

At time t4, the first clock signal A rises from the low level to the high level, while the second clock signal B drops from the high level to the low level. The increase of the voltage level of the first clock signal A is $V_{DD}$. Through the coupling effect of the first capacitor C1, the voltage level of the second node Y of the first-stage charge transfer unit 31 is also increased by $V_{DD}$, i.e., $V_{Y,t4}=V_{Yt4\_}+V_{DD}=-V_{DD}+V_{DD}=0V$. Similarly, through the coupling effect of the second capacitor C3, the voltage level of the sixth node Q of the output unit 33 is also increased by $V_{DD}$, i.e., $V_{Q,t4}=V_{Qt4\_}+V_{DD}=(-3V_{DD}+|V_{tp0}|)+V_{DD}=-2V_{DD}+|V_{tp0}|$. The decrease of the voltage level of the second clock signal B is $V_{DD}$. Through the coupling effect of the first capacitor C2, the voltage level of the second node Y' of the second-stage charge transfer unit 32 is also decreased by $V_{DD}$, i.e., $V_{P,t4}=V_{P,t4\_}-V_{DD}=-V_{DD}-V_{DD}=-2V_{DD}$.

(a) the first-stage charge transfer unit 31

$V_{Y,t4}=V_{X,t4}=0V$, meaning the second node Y of the first-stage charge transfer unit 31 changes between 0V and $-V_{DD}$ to completely transfer charges from the second-stage charge transfer unit 32.

(b) the second-stage charge transfer unit 32

The ninth transistor Mc is on because $V_{SG,Mc}=V_{Y,t4}-V_{P,t4}=0-(-2V_{DD})=2V_{DD}>|V_{tp0}|$. The tenth transistor Md is off because $V_{SG,Md}=V_{P,t4}-V_{Y,t4}=-2V_{DD}<|V_{tp0}|$. The voltage level of the eighth node NW2 is therefore equal to that of the first node X', i.e., $V_{NW2}=0V$. The first transistor M34 is off because $V_{SG,M34}=V_{P,t4}-V_{Y,t4}=-2V_{DD}<|V_{tp0}|$. The third transistor M36 is on because $V_{SG,M36}=V_{Y,t4}-V_{P,t4}=0-(-2V_{DD})=2V_{DD}>|V_{tp0}|$. The fourth transistor M37 is off because $V_{GS,M37}=V_{P,t4}-V_{Q,t4}=(-2V_{DD})-(-2V_{DD}+|V_{tp0}|)=-|V_{tp0}|<V_{tN}$. The second transistor M35 is off because $V_{SG,M35}=V_{P,t4}-V_{S,M35}=V_{P,t4}-V_{Y,t4}=-2V_{DD}<|V_{tp0}|$. At t=t4, because both the first transistor M34 and the second transistor M35 are off, the second-stage charge transfer unit 32 has no charge transfer function.

(c) the output unit 33

$V_{OUT,t4}=V_{P,t4}=2V_{DD}$, meaning the voltage level of the output node Nout is kept at $-2V_{DD}$ to completely transfer charges from the load capacitor Cout.

In the above first mode, the first-stage (odd-numbered-stage) charge transfer unit 31 and the output unit 33 are enabled, while the second-stage (even-numbered-stage) charge transfer unit 32 is disabled. Thereby, the first-stage (odd-numbered-stage) charge transfer unit 31 completely transfers charges from the second-stage (even-numbered-stage) charge transfer unit 32, the output unit 33 completely transfers charges from the output node Nout, but the second-stage charge transfer unit 32 has no charge transfer function. In the above second mode, the second-stage (even-numbered-stage) charge transfer unit 32 is enabled, while the first-stage (odd-numbered-stage) charge transfer unit 31 and the output unit 33 are disabled. Thereby, the second-stage charge transfer unit 32 completely transfers charges from the output unit 33, and the output unit 33 has no charge transfer function. Therefore, by repetitively switching the charge transfer units 31 and 32 and the output unit 33 between the first mode and the second mode, an output voltage can be finally generated at the output node Nout, i.e., $V_{OUT}=-2V_{DD}$. If a voltage level of $-N\times V_{DD}$ is desired, it is only necessary to cascade N stages of charge transfer units and an output unit. The voltage level of each node and operational status of each transistor at different times are summarized in Table 1 below.

TABLE 1

| Node | t = 0 | t = t0 | t = t1_ | t = t1 | t = t2_ | t = t2 | t = t3_ | t = t3 | t = t4_ | t = t4 | t = t5_ |
|---|---|---|---|---|---|---|---|---|---|---|---|
| Y | $V_{Y0}$ | $V_{Y0}+V_{DD}$ | 0 | $-V_{DD}$ | $-V_{DD}$ | 0 | 0 | $-V_{DD}$ | $-V_{DD}$ | 0 | $-V_{DD}$ |
| P | $V_{P0}$ | $V_{P0}-V_{DD}$ | $V_{P0}-V_{DD}$ | $V_{P0}$ | $-V_{DD}$ | $-2V_{DD}$ | $-2V_{DD}$ | $-V_{DD}$ | $-V_{DD}$ | $-2V_{DD}$ | $-2V_{DD}$ |
| Q | $V_{Q0}$ | $V_{Q0}+V_{DD}$ | $V_{P0}-V_{DD}+|V_{tp0}|$ | $V_{P0}-2V_{DD}+|V_{tp0}|$ | $V_{P0}-2V_{DD}+|V_{tp0}|$ | $V_{P0}-V_{DD}+|V_{tp0}|$ | $-2V_{DD}+|V_{tp0}|$ | $-3V_{DD}+|V_{tp0}|$ | $-3V_{DD}+|V_{tp0}|$ | $-2V_{DD}+|V_{tp0}|$ | $-2V_{DD}+|V_{tp0}|$ |
| OUT | $V_{OUT0}$ | $V_{OUT0}$ | $V_{P0}-V_{DD}$ | $V_{P0}-V_{DD}$ | $V_{P0}-V_{DD}$ | $V_{P0}-V_{DD}$ | $-2V_{DD}$ | $-2V_{DD}$ | $-2V_{DD}$ | $-2V_{DD}$ | $-2V_{DD}$ |
| First-stage charge transfer unit 31 | — | ON | ON | X | X | ON | ON | X | X | ON | ON |
| Second-stage charge transfer unit 32 | — | X | X | ON | ON | X | X | ON | ON | X | X |
| Output unit 33 | — | ON | ON | X | X | ON | ON | X | X | ON | ON |

Figure 4A:
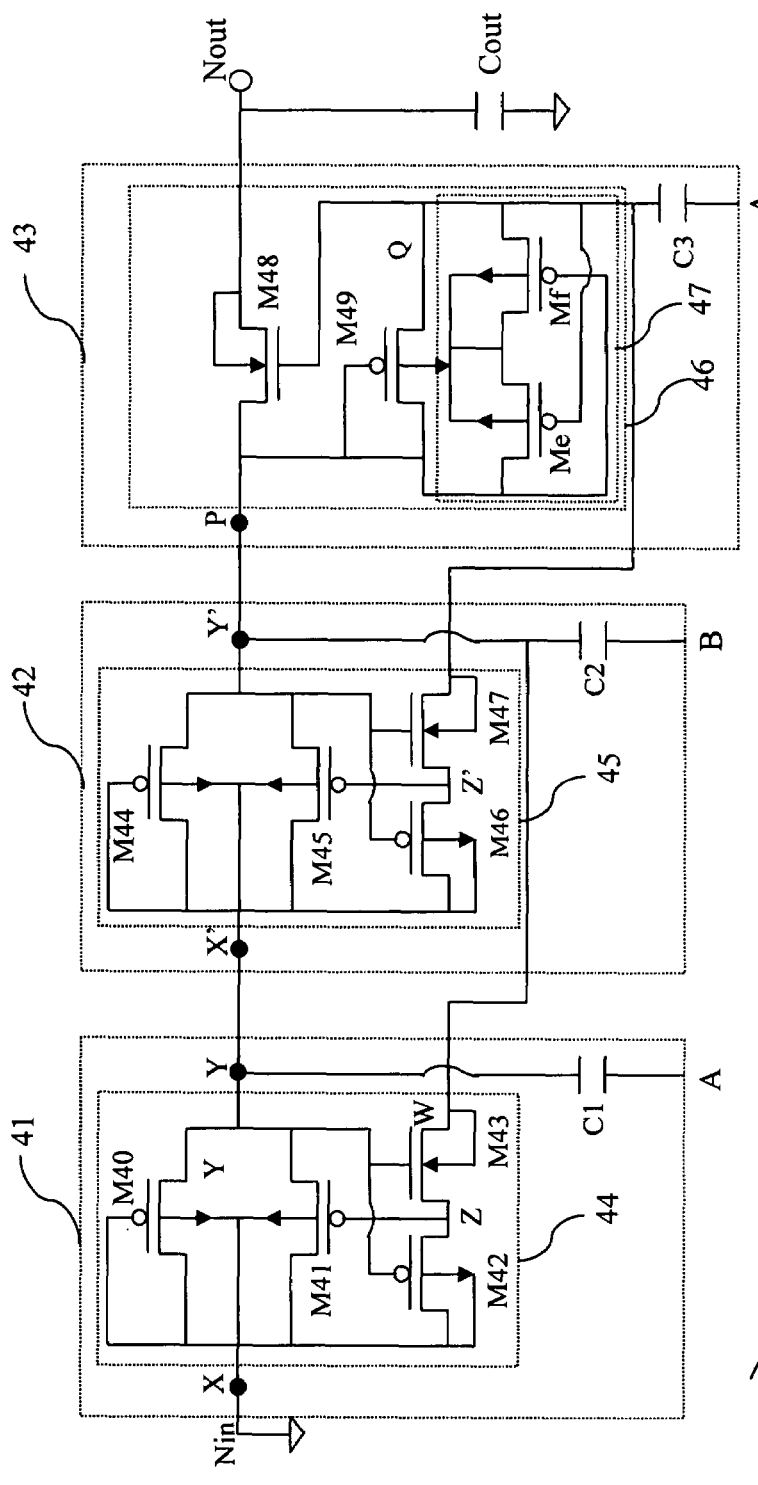
FIG. 4(a) is a diagram of a charge pump device according to a second embodiment of the present invention.

FIG. 4(a) is a diagram of a charge pump device according to a second embodiment of the present invention. Please also refer to FIG. 4(b). A charge pump device 40 is composed of two stages of charge transfer units 41 and 42 and an output unit 43 that are cascaded between an input node Nin and an output node Nout. The charge transfer unit 41 (42) includes a first circuit 44 (45) and a first capacitor C1 (C2). The output unit 43 has a second circuit 46. The second circuit 46 has a second well bias circuit 47 therein. In order to get a negative voltage, the input node Nin is grounded. This second embodiment differs from the above first embodiment in that the first circuits 44 and 45 in the charge transfer units 31 and 32 have no first well bias circuit that exists in the first embodiment.

PMOS transistors in the first-stage charge transfer unit 41 include a first transistor M40, a second transistor M41 and a third transistor M42. The N-well regions of the first transistor M40, the second transistor M41 and the third transistor M42 are all biased at a first node X of the first-stage charge transfer unit 41. PMOS transistors in the second-stage charge transfer unit 42 include a first transistor M44, a second transistor M45 and a third transistor M46. The N-well regions of the first transistor M44, the second transistor M45 and the third transistor M46 are all biased at a first node X' of the second-stage charge transfer unit 42.

Figure 4B:
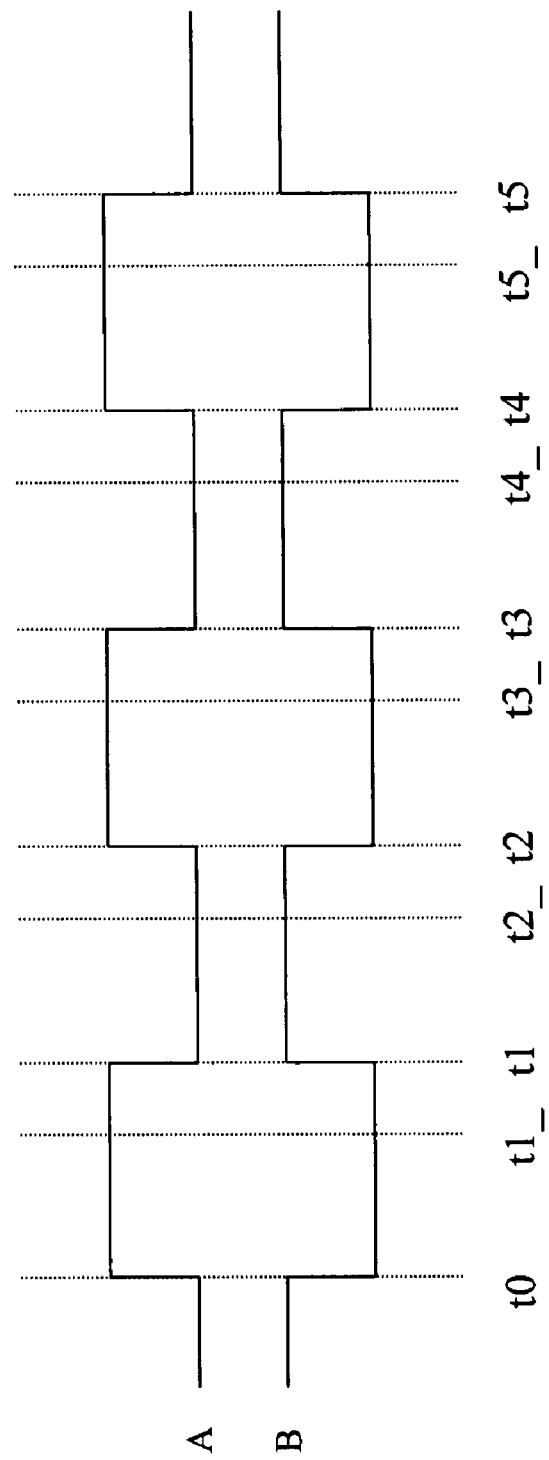
FIG. 4(b) is a diagram of the clock signal applied to the charge pump device of the second embodiment of the present invention.
Figure 5:
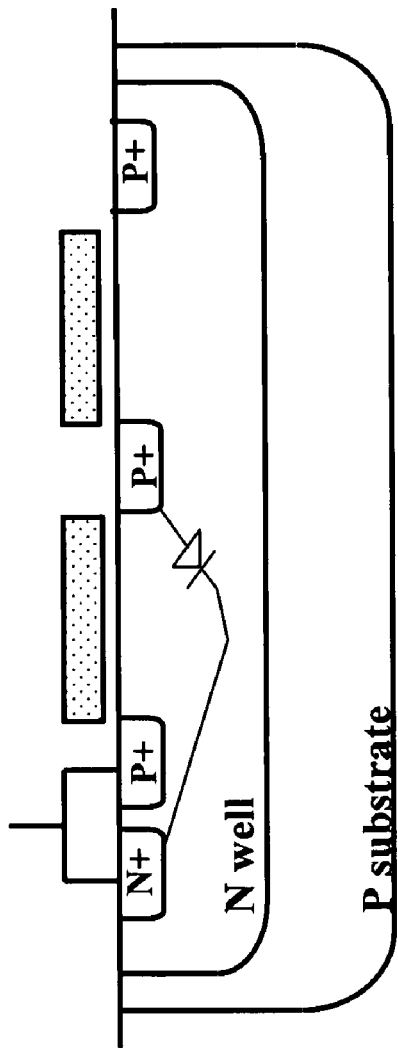
FIG. 5 is a cross-sectional view showing how a P$^+$/N-well junction diode aids in reducing the on-resistance and increasing the on-time of the first transistor to improve the charge transfer efficiency of the charge transfer unit.

Please simultaneously refer to FIG. 4(a), FIG. 4(b) and FIG. 5. When the voltage level of the second node Y' of the second-stage charge transfer unit 42 is raised through the coupling effect of the first capacitor C2 to the second clock signal B and the voltage level of the second node Y of the first-stage charge transfer unit 41 is lowered through the coupling effect of the first capacitor C1 to the first clock signal A, the first capacitor M44 will be on. Assisted by the conduction of the forward-biased P$^+$/N-well junction diode (with reference to FIG. 5), the on-resistance of the first transistor M44 is reduced, and the on-time thereof is increased, thereby improving the charge transfer efficiency of the charge transfer unit 42.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What we claimed is:

1. A charge pump device comprising:
    an input node connected to a voltage source;
    an output node for providing an output voltage;
    a clock control unit for providing a first clock signal and a second clock signal that are mutually opposite in phase;
    at least two cascaded stages of charge transfer units each comprising a first node, a second node, a first circuit connected between said first and second nodes, a first capacitor, said first capacitor being connected to said second node and said clock control unit, said first node of the first stage of said charge transfer units being connected to said input node, said first node and said second node of another stage of said charge transfer units being connected to said second node and said first circuit of the previous stage of said charge transfer units, respectively; and
    an output unit comprising a third node, a second circuit and a second capacitor connected to said clock control unit, said third node being connected to said second node of the last stage of said charge transfer units, said second circuit being connected to said third node, said output node, said second capacitor, and said first circuit of the last stage of said charge transfer units;
    wherein said first circuit comprises a fourth node, a fifth node, a first transistor a second transistor, a third transistor and a fourth transistor, substrates of said first transistor, said second transistor and said third transistor are connected to said first node, said fifth node is connected to the substrate of said fourth transistor and said second node of the next stage of said charge transfer units, said second circuit comprises a sixth nodes a seventh node, a fifth transistor a sixth transistor a seventh transistor and an eighth transistor, substrates of said fifth transistor, said sixth transistor and said seventh transistor are connected to said seventh node, the substrate of said eighth transistor is connected to said output nodes said sixth node is connected to said eighth transistor, said second capacitor and said fifth node of the last stage of said charge transfer units.

2. The charge pump device as claimed in claim 1, wherein the voltage level of said voltage source is ground.

3. The charge pump device as claimed in claim 1, wherein said first transistor, said second transistor, said third transistor, said fifth transistor, said sixth transistor and said seventh transistor are PMOS transistors, and said fourth transistor and said eighth transistor are NMOS transistors.

4. The charge pump device as claimed in claim 1, wherein a drain and a gate of said first transistor, a drain of said second transistor and a source of said third transistor are connected to said first node, a source of said first transistor, a source of said second transistor, a gate of said third transistor and a gate of said fourth transistor are connected to said second node, a gate of said second transistor, a drain of said third transistor and a drain of said fourth transistor are connected to said fourth node, a source of said fourth transistor is connected to said fifth node in said first circuit, a source of said fifth transistor, a gate of said sixth transistor, a drain and a gate of said seventh transistor and a source of said eighth transistor are connected to said third node, a gate of said fifth transistor, a source of said sixth transistor, a source of said seventh transistor and a gate of said eighth transistor are connected to said sixth node, and a drain of said fifth transistor and a drain of said sixth transistor are connected to said seventh node in said second circuit.

5. The charge pump device as claimed in claim 4, wherein said first transistor, said second transistor, said third transistor, said fifth transistor, said sixth transistor and said seventh transistor are PMOS transistors, and said fourth transistor and said eighth transistor are NMOS transistors.

6. A charge pump device comprising:
    an input node connected to a voltage source;
    an output node for providing an output voltage;
    a clock control unit for providing a first clock signal and a second clock signal that are mutually opposite in phase;
    at least two cascaded stages of charge transfer units each comprising a first node, a second node, a first circuit connected between said first and second nodes, and a first capacitor said first capacitor being connected to said second node and said clock control unit, said first node of the first stage of said charge transfer units being connected to said input node, said first node and said second node of another stage of said charge transfer units being connected to said second node and said first circuit of the previous stage of said charge transfer units, respectively; and
    an output unit comprising a third node, a second circuit and a second capacitor connected to said clock control unit said third node being connected to said second node of the last stage of said charge transfer units said second circuit being connected to said third node, said output node, said second capacitor and said first circuit of the last stage of said charge transfer units;

wherein said first circuit comprises a fourth node, a fifth node, an eighth node, a first transistor, a second transistor, a third transistor, a fourth transistor and a first well bias circuit, said first well bias circuit comprises a ninth transistor and a tenth transistor and used to provide a first bias for said eighth node, substrates of said first transistor, said second transistor and said third transistor are connected to said eighth node, said fifth node is connected to a substrate of said fourth transistor and said second node of the next stage of said charge transfer units, said second circuit comprises a sixth node, a seventh node, a second well bias circuit, a seventh transistor and an eighth transistor, said second well bias circuit comprises a fifth transistor and a sixth transistor and used to provide a second bias for said seventh transistor, substrates of said fifth transistor, said sixth transistor and said seventh transistor are connected to said seventh node, a substrate of said eighth transistor is connected to said output node, said sixth node is connected to said eighth transistor, said second capacitor and said fifth node of the last stage of said charge transfer units.

7. The charge pump device as claimed in claim 6, wherein said first transistor, said second transistor, said third transistor, said fifth transistor, said sixth transistor, said seventh transistor, said ninth transistor and said tenth transistor are PMOS transistors, and said fourth transistor and said eighth transistor are NMOS transistors.

8. The charge pump device as claimed in claim 6, wherein, in said first circuit, a drain and a gate of said first transistor, a drain of said second transistor, a source of said third transistor, a source of said ninth transistor and a gate of said tenth transistor are connected to said first node, a source of said first transistor, a source of said second transistor, a gate of said third transistor, a gate of said fourth transistor, a gate of said ninth transistor and a source of said tenth transistor are connected to said second node, a gate of said second transistor, a drain of said third transistor and a drain of said fourth transistor are connected to said fourth node, a source of said fourth transistor is connected to said fifth node, a drain and a substrate of said ninth transistor and a drain and a substrate of said tenth transistor are connected to said eighth node; in said second circuit, a source of said fifth transistor, a gate of said sixth transistor, a drain and a gate of said seventh transistor and a source of said eighth transistor are connected to said third node, a gate of said fifth transistor, a source of said sixth transistor, a source of said seventh transistor and a gate of said eighth transistor are connected to said sixth node, and a drain of said fifth transistor and a drain of said sixth transistor are connected to said seventh node.

9. The charge pump device as claimed in claim 8, wherein said first transistor, said second transistor, said third transistor, said fifth transistor, said sixth transistor, said seventh transistor, said ninth transistor and said tenth transistor are PMOS transistors, and said fourth transistor and said eighth transistor are NMOS transistors.

10. An operating method for a charge pump device comprising the steps of:
(a) establishing a charge pump device comprising:
an input node connected to a voltage source;
an output node for providing an output voltage;
a clock control unit for providing a first clock signal and a second clock signal that are mutually opposite in phase;
at least two cascaded stages of charge transfer units each comprising a first node, a second node, a first circuit connected between said first and second nodes, a first capacitor said first capacitor being connected to said second node and said clock control unit, said first node of the first stage of said charge transfer units being connected to said input nodes said first node and said second node of another stage of said charge transfer units being connected to said second node and said first circuit of the previous stage of said charge transfer units, respectively; and
an output unit comprising a third node, a second circuit and a second capacitor connected to said clock control unit, said third node being connected to said second node of the last stage of said charge transfer units, said second circuit being connected to said third nodes said output nodes said second capacitor, and said first circuit of the last stage of said charge transfer units;
(b) generating said first clock signal and said second clock signal both of which have an amplitude of voltage level of $V_{DD}$;
(c) applying said first clock signal to said first capacitor of the odd-numbered stage of said charge transfer units and said second capacitor of said output unit and applying said second clock signal to said first capacitor of the even-numbered stage of said charge transfer units at the same time;
(d) enabling the odd-numbered stage of said charge transfer units and said output unit and disabling the even-numbered stage of said charge transfer units in a first mode so that the odd-numbered stage of said charge transfer units can completely transfer charges from the next stage (even-numbered stage) of said charge transfer units and said output unit can completely transfer charges from said output node with the even-numbered stage of said charge transfer units not transferring charges;
(e) enabling the even-numbered stage of said charge transfer units and disabling the odd-numbered stage of said charge transfer units and said output unit in a second mode so that the even-numbered stage of said charge transfer units can completely transfer charges from the next stage (odd-numbered stage) of said charge transfer units with the odd-numbered stage of said charge transfer units not transferring charges; and
(f) repeating said step (d) to said step (e) until said output node finally generates said output voltage with a maximum level up to $-N \times V_{DD}$.

11. An operating method for the charge pump device comprising the steps of:
(a) establishing a charge pump device comprising:
an input node connected to a voltage source;
an output node for providing an output voltage;
a clock control unit for providing a first clock signal and a second clock signal that are mutually opposite in phase;
at least two cascaded stages of charge transfer units each comprising a first node, a second node, a first circuit connected between said first and second nodes, a first capacitor said first capacitor being connected to said second node and said clock control unit, said first node of the first stage of said charge transfer units being connected to said input node, said first node and said second node of another stage of said charge transfer units being connected to said second node and said first circuit of the previous stage of said charge transfer units respectively, and an output unit comprising a third node, a second circuit and a second capacitor connected to said clock control unit said third node being connected to said second node of the last stage of said charge transfer units said second circuit being connected to said third node, said output node, said second capacitor and said first circuit of the last stage of said charge transfer units;

wherein said first circuit comprises a fourth node, a fifth node, a first transistor, a second transistor, a third transistor and a fourth transistor, substrates of said first transistor, said second transistor and said third transistor are connected to said first node, said fifth node is connected to the substrate of said fourth transistor and said second node of the next stage of said charge transfer units, said second circuit comprises a sixth node, a seventh node, a fifth transistor, a sixth transistor, a seventh transistor and an eighth transistor, substrates of said fifth transistor, said sixth transistor and said seventh transistor are connected to said seventh node, the substrate of said eighth transistor, is connected to said output nodes said sixth node is connected to said eighth transistor, said second capacitor and said fifth node of the last stage of said charge transfer units;

(b) generating said first clock signal and said second clock signal both of which have an amplitude of voltage level of $V_{DD}$;

(c) applying said first clock signal to the odd-numbered stage of said charge transfer units and said output unit and applying said second clock signal to the even-numbered stage of said charge transfer units at the same time;

(d) enabling said first transistor, said second transistor and said fourth transistor of the odd-numbered stage of said charge transfer units and said sixth transistor, said seventh transistor and said eighth transistor of said output unit and disabling said first transistor, said second transistor and said fourth transistor of the even-numbered stage of said charge transfer units in a first mode so that the odd-numbered stage of said charge transfer units can completely transfer charges from the next stage (even-number-stage) of said charge transfer units and said output unit can completely transfer charges from said output node with the even-numbered stage of said charge transfer units not transferring charges;

(e) enabling said first transistor, said second transistor and said fourth transistor of the even-numbered stage of said charge transfer units and disabling said first transistor, said second transistor and said fourth transistor of the odd-numbered stage of said charge transfer units and said eighth transistor, said ninth transistor and said tenth transistor of said output unit in a second mode so that the even-numbered stage of said charge transfer units can completely transfer charges from the next stage (odd-numbered stage) of said charge transfer units with the odd-numbered stage of said charge transfer units not transferring charges; and (f) repeating said step (d) to said step (e) until said output node finally generates said output voltage with a maximum level up to $\times N \times V_{DD}$.

12. An operating method for the charge pump device comprising the steps of:

(a) establishing a charge pump device comprising:
an input node connected to a voltage source;
an output node for providing an output voltage;

a clock control unit for providing a first clock signal and a second clock signal that are mutually opposite in phase;

at least two cascaded stages of charge transfer units each comprising a first node, a second node, a first circuit connected between said first and second nodes, and a first capacitor, said first capacitor being connected to said second node and said clock control unit, said first node of the first stage of said charge transfer units being connected to said input node, said first node and said second node of another stage of said charge transfer units being connected to said second node and said first circuit of the previous stage of said charge transfer units, respectively; and an output unit comprising a third node, a second circuit and a second capacitor connected to said clock control unit, said third node being connected to said second node of the last stage of said charge transfer units, said second circuit being connected to said third node, said output node, said second capacitor, and said first circuit of the last stage of said charge transfer units;

wherein said first circuit comprises a fourth node, a fifth node, an eighth node, a first transistor, a second transistor, a third transistor, a fourth transistor and a first well bias circuit, said first well bias circuit comprises a ninth transistor and a tenth transistor and used to provide a first bias for said eighth node, substrates of said first transistor, said second transistor and said third transistor are connected to said eighth node, said fifth node is connected to a substrate of said fourth transistor and said second node of the next stage of said charge transfer units, said second circuit comprises a sixth node, a seventh node, a second well bias circuit, a seventh transistor and an eighth transistor, said second well bias circuit comprises a fifth transistor and a sixth transistor and used to provide a second bias for said seventh transistor, substrates of said fifth transistor, said sixth transistor and said seventh transistor are connected to said seventh node, a substrate of said eighth transistor is connected to said output node, said sixth node is connected to said eighth transistor, said second capacitor and said fifth node of the last stage of said charge transfer units;

(b) generating said first clock signal and said second clock signal both of which have an amplitude of voltage level of $V_{DD}$;

(c) applying said first clock signal to the odd-numbered stage of said charge transfer units and said output unit and applying said second clock signal to the even-numbered stage of said charge transfer units at the same time;

(d) enabling said first transistor, said second transistor, said fourth transistor and said tenth transistor of the odd-numbered stage of said charge transfer units and said sixth transistor, said seventh transistor and said eighth transistor of said output unit and disabling said first transistor, said second transistor, said fourth transistor and said tenth transistor of the even-numbered stage of said charge transfer units in a first mode so that the odd-numbered stage of said charge transfer units can completely transfer charges from the next stage (even-numbered stage) of said charge transfer units and said output unit can completely transfer charges from said output node with the even-numbered stage of said charge transfer units not transferring charges;

(e) enabling said first transistor, said second transistor and said fourth transistor of the even-numbered stage of said charge transfer units and disabling said first transistor, said second transistor and said fourth transistor of the odd-numbered stage of said charge transfer units and said eighth transistor, said ninth transistor and said tenth transistor of said output unit in a second mode so that the even-numbered stage of said charge transfer units can completely transfer charges from the next stage (odd-numbered-stage) of said charge transfer units with the odd-numbered stage of said charge transfer units not transferring charges; and (f) repeating said step (d) to said step (e) until said output node finally generates said output voltage with a maximum level up to $-N \times V_{DD}$.

* * * * *